(12) United States Patent
Shah (10) Patent No.: US 11,640,334 B2
(45) Date of Patent: May 2, 2023

(54) ERROR RATES FOR MEMORY WITH BUILT IN ERROR CORRECTION AND DETECTION

(71) Applicant: Microsoft Technology Licensing, LLC, Redmond, WA (US)

(72) Inventor: Monish Shah, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/326,927

(22) Filed: May 21, 2021

(65) Prior Publication Data

US 2022/0374307 A1    Nov. 24, 2022

(51) Int. Cl.
G06F 11/00    (2006.01)
G06F 11/10    (2006.01)

(52) U.S. Cl.
CPC ................ G06F 11/1068 (2013.01)

(58) Field of Classification Search
None
See application file for complete search history.

(56) References Cited

U.S. PATENT DOCUMENTS

| 6,009,548 A * | 12/1999 | Chen ................ H03M 13/151 714/763 |
| 2004/0003165 A1* | 1/2004 | Schulz ................ G06F 13/1668 714/E11.047 |
| 2011/0320918 A1* | 12/2011 | Alves ................ H03M 13/2906 714/784 |
| 2014/0068319 A1* | 3/2014 | Daly .................... G11C 7/1006 711/E12.008 |
| 2016/0011940 A1 | 1/2016 | Hu et al. |
| 2018/0101424 A1 | 4/2018 | Lim et al. |
| 2019/0042358 A1 | 2/2019 | Criss et al. |
| 2019/0042369 A1* | 2/2019 | Deutsch ................ G06F 3/0673 |
| 2019/0138230 A1* | 5/2019 | Lim ...................... G06F 3/0619 |

(Continued)

FOREIGN PATENT DOCUMENTS

WO    2017192626 A1    11/2017

OTHER PUBLICATIONS

Y. Cai, S. Ghose, E. F. Haratsch, Y. Luo and O. Mutlu, "Error Characterization, Mitigation, and Recovery in Flash-Memory-Based Solid-State Drives," in Proceedings of the IEEE, vol. 105, No. 9, pp. 1666-1704, Sep. 2017, doi: 10.1109/JPROC.2017.2713127. (Year: 2017).*

(Continued)

*Primary Examiner* — Daniel F. McMahon
(74) *Attorney, Agent, or Firm* — Ray Quinney & Nebeker; Tiffany Healy (57) ABSTRACT

The methods and systems improve uncorrectable error (UE) and silent data corruption (SDC) rates for memory chips and improve error correction of the memory chips. The systems may include a memory bank with a plurality of memory chips in communication with a memory controller. The memory bank may use one additional memory chip that stores a bitwise parity of the data stored in the remaining memory chips of the memory bank. The parity bits are used to rebuild corrupted data when a UE occurs. The parity bits are also used to detect whether a SDC occurred in the data.

19 Claims, 7 Drawing Sheets

(56) References Cited

U.S. PATENT DOCUMENTS

2021/0279127 A1\* 9/2021 Jang .................... G06F 11/1076

OTHER PUBLICATIONS

Nair, et al., "XED: Exposing On-Die Error Detection Information for Strong Memory Reliability", In Proceeding of ACM/IEEE 43rd Annual International Symposium on Computer Architecture, Jun. 18, 2016, pp. 341-353.
"International Search Report and Written Opinion Issued in PCT Application No. PCT/US22/024320", dated Jul. 8, 2022, 19 Pages.

\* cited by examiner

| | |
|---|---|
| Bit 64 = Bit 0 ⊕ Bit 16 ⊕ Bit 32 ⊕ Bit 48 | ~ 202 |
| Bit 65 = Bit 1 ⊕ Bit 17 ⊕ Bit 33 ⊕ Bit 49 | ~ 204 |
| Bit 66 = Bit 2 ⊕ Bit 18 ⊕ Bit 34 ⊕ Bit 50 | ~ 206 |
| Bit 67 = Bit 3 ⊕ Bit 19 ⊕ Bit 35 ⊕ Bit 51 | ~ 208 |
| Bit 68 = Bit 4 ⊕ Bit 20 ⊕ Bit 36 ⊕ Bit 52 | ~ 210 |
| Bit 69 = Bit 5 ⊕ Bit 21 ⊕ Bit 37 ⊕ Bit 53 | ~ 212 |
| Bit 70 = Bit 6 ⊕ Bit 22 ⊕ Bit 38 ⊕ Bit 54 | ~ 214 |
| Bit 71 = Bit 7 ⊕ Bit 23 ⊕ Bit 39 ⊕ Bit 55 | ~ 216 |
| Bit 72 = Bit 8 ⊕ Bit 24 ⊕ Bit 40 ⊕ Bit 56 | ~ 218 |
| Bit 73 = Bit 9 ⊕ Bit 25 ⊕ Bit 41 ⊕ Bit 57 | ~ 220 |
| Bit 74 = Bit 10 ⊕ Bit 26 ⊕ Bit 42 ⊕ Bit 58 | ~ 222 |
| Bit 75 = Bit 11 ⊕ Bit 27 ⊕ Bit 43 ⊕ Bit 59 | ~ 224 |
| Bit 76 = Bit 12 ⊕ Bit 28 ⊕ Bit 44 ⊕ Bit 60 | ~ 226 |
| Bit 77 = Bit 13 ⊕ Bit 29 ⊕ Bit 45 ⊕ Bit 61 | ~ 228 |
| Bit 78 = Bit 14 ⊕ Bit 30 ⊕ Bit 46 ⊕ Bit 62 | ~ 230 |
| Bit 79 = Bit 15 ⊕ Bit 31 ⊕ Bit 47 ⊕ Bit 63 | ~ 232 |

| Bits 0 – 15 | Bits 16 – 31 | Bits 32 – 47 | Bits 48 – 63 | Bits 64 – 79 | Result |
|---|---|---|---|---|---|
| No error | No error | No error | No error | No error | No error |
| UE | No error | No error | No error | No error | Recovered |
| No error | UE | No error | No error | No error | Recovered |
| No error | No error | UE | No error | No error | Recovered |
| No error | No error | No error | UE | No error | Recovered |
| No error | No error | No error | No error | UE | Recovered |
| Any combination with 2 or more UEs | | | | | UE |
| SDC | No error | No error | No error | No error | UE |
| No error | SDC | No error | No error | No error | UE |
| No error | No error | SDC | No error | No error | UE |
| No error | No error | No error | SDC | No error | UE |
| No error | No error | No error | No error | SDC | UE |
| Any combination with 2 or more SDC, rest "No error" | | | | | UE or SDC |
| Any combination with 1 or more SDC, 1 UE, rest "No error" | | | | | SDC |
| Any combination with 1 or more SDC, 2 or more UE, rest "No error" | | | | | UE |

ERROR RATES FOR MEMORY WITH BUILT IN ERROR CORRECTION AND DETECTION

BACKGROUND

Newer dynamic random-access memory (DRAM) technologies, such as double data rate 5 DRAM (DDR5), are adopting built-in error correction code (ECC) in the DRAM chips. As a next step, future versions of various DRAM technologies may add the capability to detect uncorrectable errors. The resulting uncorrectable error (UE) rates and silent data corruption (SDC) rates are typically sufficient for consumer applications, which generally do not have high standards for data integrity. However, server systems require higher standards for data integrity relative to consumer applications.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a system. The system may include a plurality of memory chips with built in error detection, wherein a subset of the memory chips stores data and one memory chip different from the subset of the memory chips stores parity bits. The system may include a memory controller in communication with the plurality of memory chips, wherein the memory controller is operable to: receive a write request for the data; determine the parity bits by performing an exclusive OR operation on each bit of the data and storing the parity bits in the one memory chip; and store the data in the subset of the memory chips based on a width of bits (bit-width) for each memory chip.

Another example implementation relates to a system. The system may include a plurality of memory chips with built in error detection arranged in a vertical orientation sharing a single data bus, wherein a subset of the memory chips stores data and a memory chip different from the subset of the memory chips stores parity bits. The system may include a memory controller in communication with the plurality of memory chips, wherein the memory controller is operable to: receive a write request for the data, wherein the memory controller writes to one memory chip of the subset of the memory chips for the write request; determine the parity bits for the data by reading existing parity bits stored in the memory chip and performing an exclusive OR operation the data and the existing parity bits; and update the parity bit for the one memory chip of the subset of the memory chips.

Another example implementation relates to a method. The method may include receiving a read request for data, wherein a subset of a plurality of memory chips with built in error detection stores the data. The method may include receiving the data from the subset of the memory chips. The method may include receiving parity bits, wherein one memory chip in the plurality of memory chips, different from the subset of the memory chips, stores the parity bits. The method may include receiving an indication from any of the built in error detection of the plurality of memory chips whether an uncorrectable error (UE) occurred in the data. The method may include identifying a memory chip that sent the indication that the UE occurred. The method may include generating recovered data for the memory chip by rebuilding corrupted data for the memory chip using the parity bits by performing an exclusive OR operation with the parity bits and the data from the plurality of memory chips that did not send the indication.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Newer dynamic random-access memory (DRAM) technologies, such as DDR5, are adopting built-in error correction code (ECC) in the DRAM chips. As a next step, future versions of various DRAM technologies may add the capability to detect uncorrectable errors. Error correction code (ECC) adds extra information to the data that is stored in memory so if some errors occur during the storing of the data, when the data is read from the memory, the errors may be corrected. A commonly used ECC in memory systems performs single bit error correction and dual bit error detection.

A typical implementation of ECC includes 64 bits of data and 8 bits of redundancy for ECC. If any one bit of the 72 bits is incorrect when read from memory, the ECC detects the error and identifies which bit of the 72 bits is incorrect.

By identifying the bit that has an error, the error may be corrected. If two bits have an error, the ECC identifies that two bits have an error but is unable to identify which two bits has the error. As such, with a dual bit error, the error may be identified (e.g., data is corrupted) but the error may be unable to be corrected. An uncorrectable error (UE) is an error identified by the ECC but is unable to be corrected. In this example, a two bit error is an uncorrectable error.

If three bits have an error, the example ECC may not detect the errors. As such, the data may be corrupted, but no error has been detected by the ECC. Silent data corruption (SDC) is when an error occurs in the data but is undetected by the ECC. As such, the data corruption is undetected by the ECC. The uncorrectable error (UE) rates and silent data corruption (SDC) rates resulting from this example ECC may be sufficient for consumer applications, which generally do not have high standards for data integrity. However, server systems require higher standards for data integrity relative to consumer applications, and thus, the current UE and SDC rates may be unacceptable for the data integrity of server systems.

DRAM memory is typically built with 64 bit of words and 8 bits of redundancy with an error code. The error rates inherent to the DRAM memory chips are increasing. The next generation of memory (e.g., DDR5, GDDR7) includes built in single bit error correction logic and only performs error correction without dual bit error detection or other types of error correction. Thus, if an error occurs in a single bit, the error is corrected using the single bit error correction. If an error occurs in two or more bits, the data is returned without any indication that an error occurred because the single bit error detection is unable to determine if an error occurred in more than one bit or provide any notification that an error occurred. As such, an SDC occurs in the data.

The present disclosure provides a new way to improve UE and SDC rates for memory chips, and thus, improves error correction for memory chips in a less expensive manner relative to current ECC methods. The present disclosure also provides a way to recover data in the face of a hard failure of an entire memory chip. In an implementation, the present disclosure may use DRAM chips. The present disclosure may use one additional DRAM chip for a bank of memory to store a bitwise parity of the data.

For example, if the DRAM chips are 8 bits wide and the entire data path required is 32 bits, four DRAM chips in the memory bank are needed for the data payload. The present disclosure adds a fifth DRAM chip to the memory bank that stores the bitwise parity of the data stored in the other four DRAM chips. The parity is generated by external logic when new data is written. When the data is read, the parity is checked by external logic, along with a status provided by each DRAM chip.

The present disclosure receives the data and the parity bits back in addition to an indication whether a UE occurred or may have occurred in any one of the memory chips in the memory bank. If one memory chip indicates a UE may have occurred or if it has failed, the data bits from the other memory chips and the parity chip may be used to recreate the data from the one missing memory chip (e.g., the memory chip that indicated the UE or that has failed or is unusable). The present disclosure determines whether to add a "0" or "1" to each of the bits from the memory chip that indicated the UE and/or failed to result in an even parity. The present disclosure allows the data to be rebuilt from losing data. As such, instead of just receiving a notification that a UE occurred, the present disclosure provides a way to correct the UE and receive the recovered data back. Thus, the host server system receives the corrected data instead of a UE, resulting in reducing the UE rates at the server system.

In addition, the present disclosure may verify whether a SDC occurred without any notification that an error occurred. The present disclosure may identify that a SDC occurred in one of the memory chips in the memory bank by performing a parity check. If one of the chips has a SDC, the present disclosure may identify the SDC when performing the parity check and the present disclosure may turn the SDC into a UE. As such, the present disclosure may reduce the SDC error rates by identifying when a SDC occurred and turning the SDC into a UE. If multiple SDCs occurred (e.g., in more than one chip), the error may be identified, resulting in a UE instead of an SDC.

One example use case for the present disclosure includes server systems, such as, but not limited to cloud applications or large corporate data centers. Server systems may have high standards of data integrity and may need additional improvements beyond the current built in error detection. The present disclosure may be used to improve the UE and SDC rates for memory chips, and thus, improve error correction of the memory chips.

Figure 1:
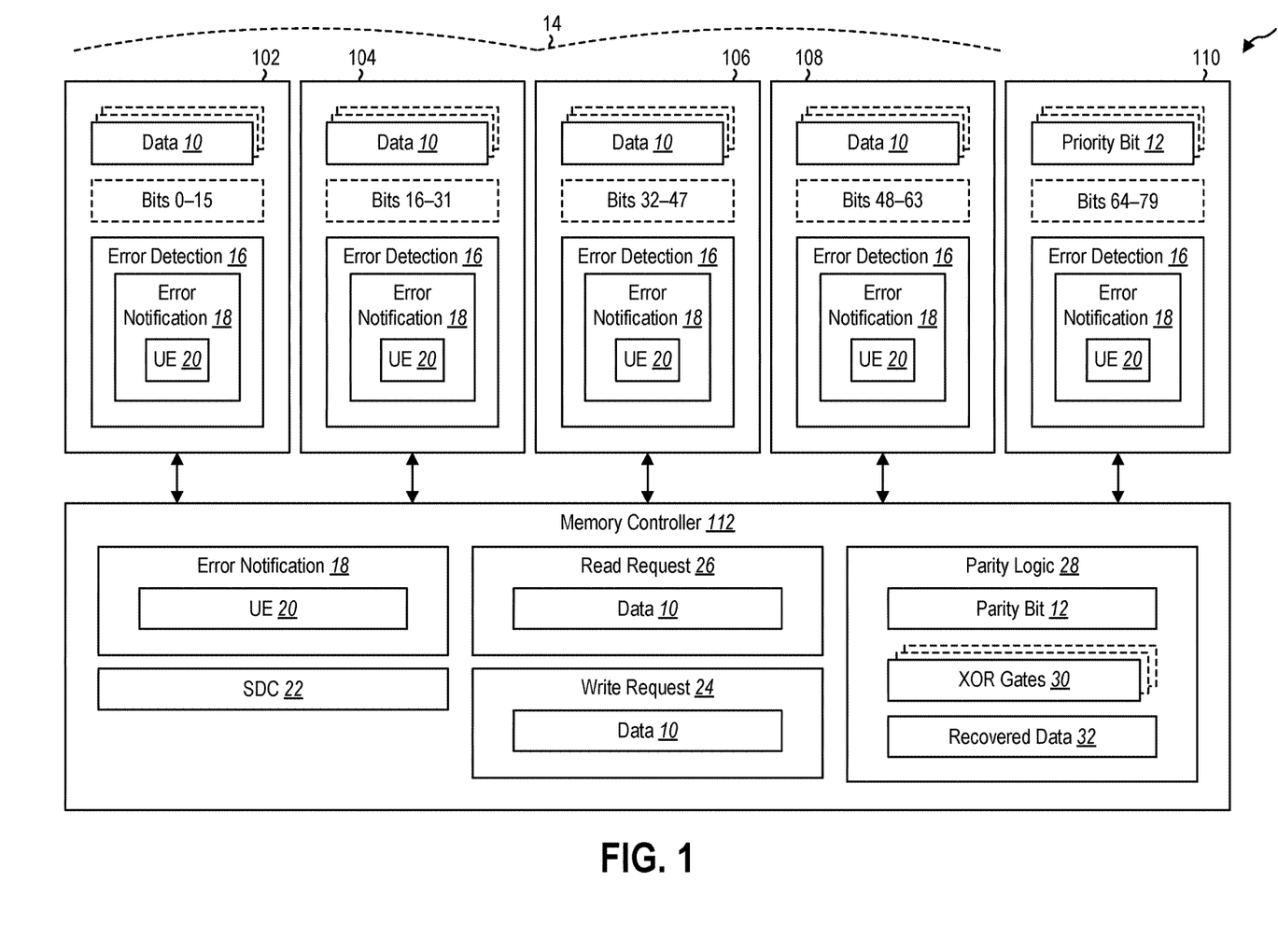
FIG. 1 illustrates an example memory bank with memory chips with built in error detection for use with error correction in accordance with implementations of the present disclosure.

Referring now to FIG. 1, illustrated is an example memory bank 100 for use with error detection and correction of errors in data 10. The memory bank 100 may be used in a server system, data centers, and/or any other environment that requires high standards of data integrity. While five memory chips 102, 104, 106, 108, 110 are illustrated, the memory bank 100 may include a plurality of memory chips up to n (where n is a positive integer). In an implementation, the memory chips 102, 104, 106, 108, 110 may be DRAM memory chips. The memory chips 102, 104, 106, 108, 110 may be any memory chip that includes built in error detection 16 that may detect when an error occurs in the data 10. Optionally, the memory chips may have error correction. By identifying that an error occurred, the error may be corrected. The error detection 16 may automatically correct the errors upon detecting the errors for a single bit of data.

If the error detection 16 determines that some bits of data have errors and those errors cannot be corrected by error correction circuitry, if present, the error detection 16 may generate an error notification 18 that a UE 20 occurred in the data 10. For example, if error correction is limited to correcting one bit, a UE 20 may occur in a memory chip when two bits of data 10 are incorrect. The error detection 16 may generate an error notification 18 indicating that a UE 20 occurred for the data 10 (e.g., that the error is unable to be corrected by the memory chip). If an error occurred during writing and/or reading of the data 10, and the data 10 is corrupted, the memory chips 102, 104, 106, 108, 110 may detect the error using the error detection 16 and send an error notification 18 to a memory controller 112 notifying the memory controller 112 that a UE 20 occurred for the data 10.

A subset of memory chips 14 (e.g., 102, 104, 106, 108) may be used to store the data 10. The subset of memory chips 14 may be one less than the total number of memory chips (e.g., n−1) in the memory bank 100. An additional memory chip (e.g., 110), different from the subset of memory chips 14, may be used to store parity bits 12 for verifying the authenticity of the data 10 and correct any errors in the data 10 that may have occurred during the storing and/or reading of the data 10. The number of memory chips included in the subset of memory chips 14 may be based on the channel width of the data. For example, if the channel width of the data is sixty four bits and the memory chips are sixteen bits wide, four memory chips are included in the subset of memory chips 14 and one additional memory chip is used for the parity bits 12. As such, the memory bank 100 may include five memory chips with a width of sixteen bits, with four memory chips in the subset of memory chips 14 (e.g., 102, 104, 106, 108) used for data 10 storage and one redundant memory chip (e.g., 110) for storing the parity bits 12.

In another example, the channel width of the data is sixty four bits and the memory chips have a width of thirty two bits. As such, the memory bank 100 may include three memory chips, each with a width of thirty two bits, with two memory chips in the subset of memory chips 14 storing the data 10 and one memory chip for storing the parity bits 12.

In yet another example, where the memory chips are 8 bits wide and the entire data path required for the data payload is thirty two bits, four memory chips are included in the subset of memory chips 14 for storing the data 10, and an additional memory chip is added to memory bank 100 that stores the bitwise parity bit 12 of the data 10 stored in the other four memory chips. As such, any number of memory chips may be used in the memory bank 100. The number of memory chips included in the subset of memory chips 14 may be based on the width of the memory chips and the total data path required for the data 10. The total number of memory chips used in the memory bank 100 may be one more than the number of memory chips included in the subset of memory chips 14.

The plurality of memory chips 102, 104, 106, 108, 110 may be arranged in a horizontal orientation and may operate in parallel. As such, all bits of data 10 and the parity bits 12 may be available at one time from the different memory chips 102, 104, 106, 108, 110 for use by the memory controller 112 for a write request 24 of the data 10 and/or a read request 26 of the data 10.

The memory controller 112 may receive a write request 24 to write the data 10 to the subset of memory chips 14. The memory controller 112 may take the bits of the data 10 and may perform an exclusive OR operation to generate the parity bits 12. For example, if the memory chips 102, 104, 108, 110 are sixteen bits wide and the data path is sixty four bits, the memory controller 112 may take bit 0 for each memory chip in the subset of memory chips 14 (e.g., 102, 104, 106, 108) and perform an exclusive OR operation and save the output as the parity bit 12 in the memory chip 110. The memory controller 112 may also take bit 1 for each memory chip in the subset of memory chips 14 and perform an exclusive OR operation and save the output as the parity bit 12 in the memory chip 110. The memory controller 112 may continue to perform the exclusive OR operation for all sixteen bits of data and store the corresponding parity bits 12 in the memory chip 110.

In an implementation, the memory controller 112 may include a parity logic 28 that includes a plurality of exclusive OR (XOR) gates 30 to perform the exclusive OR operation. The number of XOR gates 30 may equal the width of the memory chips. For example, if the width of the memory chips 102, 108, 106, 108, 110 is sixteen bits and four memory chips (e.g., 102, 104, 106, 108) are used for storing the data 10, the parity logic 28 may include sixteen different four-input XOR gates 30, one for each bit. In addition, the XOR gates 30 may operate in parallel and perform the bitwise parity concurrently for each of the bits. As such, the parity logic 28 may perform the exclusive OR operations in parallel and generate the sixteen parity bits 12, as illustrated in table 200 (FIG. 2).

Figure 2:
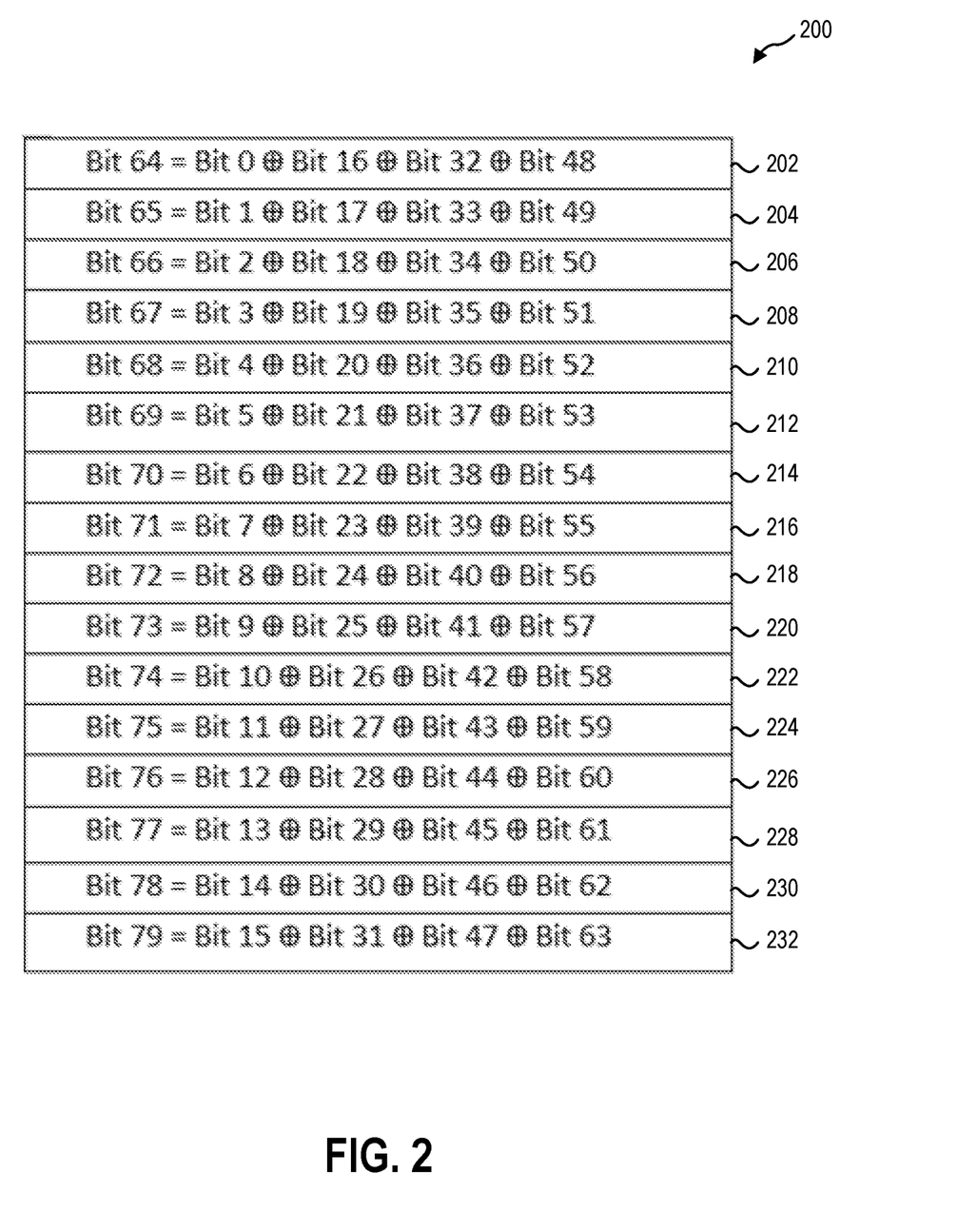
FIG. 2 illustrates an example table illustrating error correction codes (ECC) in accordance with implementations of the present disclosure.

Referring now to FIG. 2, illustrated is an example table 200 with ECC generated by the parity logic 28 (FIG. 1) for the parity bits 12 (FIG. 1). Row 202 illustrates the exclusive OR operation for bit 64 by performing the exclusive OR operation on the first bits of each of the memory chips 102, 104, 106, 108 (e.g., bit 0, bit 16, bit 32, bit 48). Row 204 illustrates the exclusive OR operation for bit 65 by performing the exclusive OR operation on the second bits of each of the memory chips 102, 104, 106, 108 (e.g., bit 1, bit 17, bit 33, bit 49). Row 206 illustrates the exclusive OR operation for bit 66 by performing the exclusive OR operation on the third bits of each of the memory chips 102, 104, 106, 108 (e.g., bit 2, bit 18, bit 34, bit 50). Row 208 illustrates the exclusive OR operation for bit 67 by performing the exclusive OR operation on the fourth bits of each of the memory chips 102, 104, 106, 108 (e.g., bit 3, bit 19, bit 35, bit 51).

Row 210 illustrates the exclusive OR operation for bit 68 by performing the exclusive OR operation on the fifth bits of each of the memory chips 102, 104, 106, 108 (e.g., bit 4, bit 20, bit 36, bit 52). Row 212 illustrates the exclusive OR operation for bit 69 by performing the exclusive OR operation on the sixth bits of each of the memory chips 102, 104, 106, 108 (e.g., bit 5, bit 21, bit 37, bit 53). Row 214 illustrates the exclusive OR operation for bit 70 by performing the exclusive OR operation on the seventh bits of each of the memory chips 102, 104, 106, 108 (e.g., bit 6, bit 22, bit 38, bit 54). Row 216 illustrates the exclusive OR operation for bit 71 by performing the exclusive OR operation on the eighth bits of each of the memory chips 102, 104, 106, 108 (e.g., bit 7, bit 23, bit 39, bit 55). Row 218 illustrates the exclusive OR operation for bit 72 by performing the exclusive OR operation on the ninth bits of each of the memory chips 102, 104, 106, 108 (e.g., bit 8, bit 24, bit 40, bit 56). Row 220 illustrates the exclusive OR operation for bit 73 by performing the exclusive OR operation on the tenth bits of each of the memory chips 102, 104, 106, 108 (e.g., bit 9, bit 25, bit 41, bit 57).

Row 222 illustrates the exclusive OR operation for bit 74 by performing the exclusive OR operation on the eleventh bits of each of the memory chips 102, 104, 106, 108 (e.g., bit 10, bit 26, bit 42, bit 58). Row 224 illustrates the exclusive OR operation for bit 75 by performing the exclusive OR operation on the twelfth bits of each of the memory chips 102, 104, 106, 108 (e.g., bit 11, bit 27, bit 43, bit 59). Row 226 illustrates the exclusive OR operation for bit 76 by performing the exclusive OR operation on the thirteenth bits of each of the memory chips 102, 104, 106, 108 (e.g., bit 12, bit 28, bit 44, bit 60). Row 228 illustrates the exclusive OR operation for bit 77 by performing the exclusive OR operation on the fourteenth bits of each of the memory chips 102, 104, 106, 108 (e.g., bit 13, bit 29, bit 45, bit 61). Row 230 illustrates the exclusive OR operation for bit 78 by performing the exclusive OR operation on the fifteenth bits of each of the memory chips 102, 104, 106, 108 (e.g., bit 14, bit 30, bit 46, bit 62). Row 230 illustrates the exclusive OR operation for bit 79 by performing the exclusive OR operation on the sixteenth bits of each of the memory chips 102, 104, 106, 108 (e.g., bit 15, bit 31, bit 47, bit 63).

As such, sixteen parity bits 12 are generated for the corresponding bits of data 10 (FIG. 1). If an odd number of inputs are true in the exclusive OR operation (e.g., an odd number of bits have a "1"), the output is true, and the parity bit 12 is set as "1." If an even number of inputs are true in the exclusive OR operation (e.g., an even number of bits have a "1"), the output is false, and the parity bit 12 is set as "0."

Referring to FIG. 1, the memory controller 112 may store the data 10 in the subset of memory chips 14 with the first sixteen bits of data (e.g., bits 0-15) in the memory chip 102, the second sixteen bits of data (e.g., bits 16-31) in the memory chip 104, the third sixteen bits of data (e.g., bits 32-47) in the memory chip 106, and the fourth sixteen bits of data (e.g., bits 48-63) in the memory chip 108 and the memory controller 112 may store the parity bits 12 (e.g., bits 64-79) in the memory chip 110. As such, the data payload is stored in bits 0 through 63 and the ECC is stored in bits 64 through 79.

The memory controller 112 may also receive a read request 26 for the data 10. The memory controller 112 may perform read operations on the plurality of memory chips (e.g., 102, 104, 106, 108, 110) and may receive the data 10 from the subset of memory chips 14 (e.g., 102, 104, 106, 108) and the parity bits 12 from the memory chip 110. For example, if the memory chips 102, 104, 108, 110 are sixteen bits wide and the data path is sixty four bits, the memory controller 112 may receive the first sixteen bits of data (e.g., bits 0-15) from the memory chip 102, the second sixteen bits of data (e.g., bits 16-31) from the memory chip 104, the third sixteen bits of data (e.g., bits 32-47) from the memory chip 106, and the fourth sixteen bits of data (e.g., bits 48-63) from the memory chip 108 and the parity bits 12 (e.g., bits 64-79) from the memory chip 110.

The memory controller 112 may also receive an error notification 18 indicating that a UE 20 occurred in one or more memory chips of the plurality of memory chips 102, 104, 106, 108, 110. The error notification 18 may indicate which memory chip(s) of the plurality of memory chips 102, 104, 106, 108, 110 had the UE 20. By receiving the error notification 18, the memory controller 112 may be alerted that the data 10 or a portion thereof, is corrupted and the memory controller 112 may prevent the usage of the corrupted data. If one memory chip had the UE 20, the memory controller 112 may use the parity logic 28 to recreate the corrupted data from the memory chip with the UE 20 using the parity bits 12 and generate recovered data 32.

In an implementation, the XOR gates 30 of the parity logic 28 may perform an exclusive OR operation to rebuild the corrupted data using the parity bits 12. As such, the same XOR gates 30 that generated the parity bits 12 may be used to regenerate the bits for the corrupted data by rebuilding the bits and generating the recovered data 32. The XOR gates 30 may use the data 10 from the remaining memory chips (e.g., the memory chips that did not send an error notification) to recreate the corrupted data for the identified memory chip with the UE 20 and generate the recovered data 32 for the identified memory chip with the UE 20. The parity logic 28 determines to add a "0" or a "1" to the recovered data 32 to result in an even parity (e.g., an even number of inputs are true) based on the XOR operation performed for each of the bits by the XOR gates 30.

In addition, the XOR gates 30 may also rebuild data from a non-functional memory chip. This is known as single device data correction (SDDC). If a memory chip is non-functional, that may be detected without receiving a UE 20 by a variety of means such as detecting that the memory chip is non-responsive to the read command. The XOR gates 30 may operate in parallel and may perform an exclusive OR operation using the bits from the remaining memory chips (e.g., the memory chips that did not fail) to recreate the corrupted data.

Figure 3:
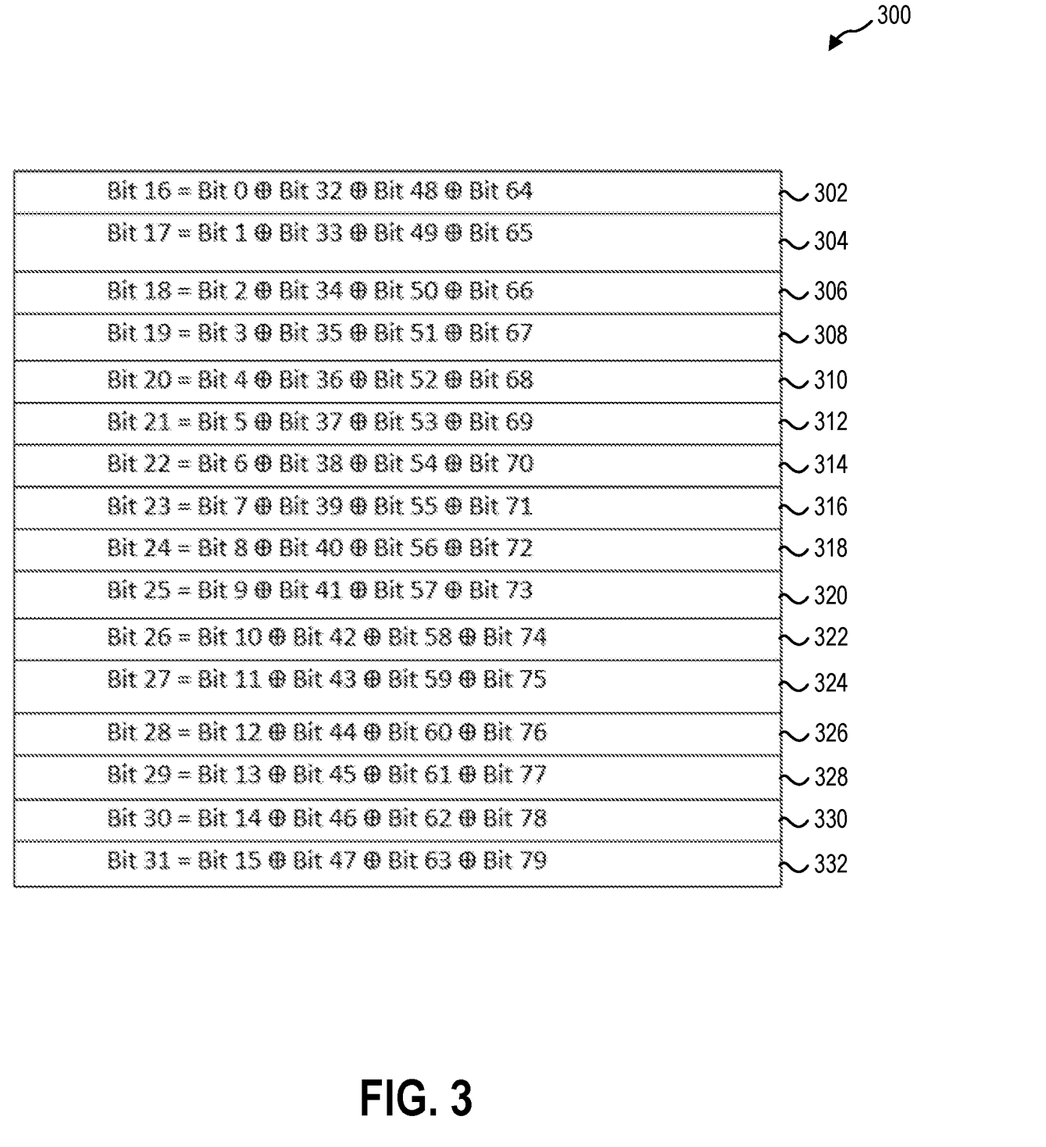
FIG. 3 illustrates an example table illustrating data recovery in accordance with implementations of the present disclosure.

Referring now to FIG. 3, illustrated is an example table 300 for rebuilding corrupted data by the parity logic 28 (FIG. 1) using the parity bits 12 (FIG. 1) for a single memory chip that identified a UE 20 and/or is non-functional. For example, if the memory chip 104 generates an error notification 18 with a UE 20, the parity logic 28 may use the data bits from the memory chips 102, 106, and 108 and the parity bits 12 from the memory chip 110 to rebuild the corrupted data from the memory chip 104.

Row 302 illustrates the exclusive OR operation for bit 16 by performing the exclusive OR operation on the first bits from the memory chips 102, 106, 108, 110 (e.g., bit 0, bit 32, bit 48, bit 64). Row 304 illustrates the exclusive OR operation for bit 17 by performing the exclusive OR operation on the second bits from the memory chips 102, 106, 108, 110 (e.g., bit 1, bit 33, bit 49, bit 65). Row 306 illustrates the exclusive OR operation for bit 18 by performing the exclusive OR operation on the third bits from the memory chips 102, 106, 108, 110 (e.g., bit 2, bit 34, bit 50, bit 66). Row 308 illustrates the exclusive OR operation for bit 19 by performing the exclusive OR operation on the fourth bits from the memory chips 102, 106, 108, 110 (e.g., bit 3, bit 35, bit 51, bit 67). Row 310 illustrates the exclusive OR operation for bit 20 by performing the exclusive OR operation on the fifth bits from the memory chips 102, 106, 108, 110 (e.g., bit 4, bit 36, bit 52, bit 68). Row 312 illustrates the exclusive OR operation for bit 21 by performing the exclusive OR operation on the sixth bits from the memory chips 102, 106, 108, 110 (e.g., bit 5, bit 37, bit 53, bit 69).

Row 314 illustrates the exclusive OR operation for bit 22 by performing the exclusive OR operation on the seventh bits from the memory chips 102, 106, 108, 110 (e.g., bit 6, bit 38, bit 54, bit 70). Row 316 illustrates the exclusive OR operation for bit 23 by performing the exclusive OR operation on the eighth bits from the memory chips 102, 106, 108, 110 (e.g., bit 7, bit 39, bit 55, bit 71). Row 318 illustrates the exclusive OR operation for bit 24 by performing the exclusive OR operation on the ninth bits from the memory chips 102, 106, 108, 110 (e.g., bit 8, bit 40, bit 56, bit 72). Row 320 illustrates the exclusive OR operation for bit 25 by performing the exclusive OR operation on the tenth bits from the memory chips 102, 106, 108, 110 (e.g., bit 9, bit 41, bit 57, bit 73).

Row 322 illustrates the exclusive OR operation for bit 26 by performing the exclusive OR operation on the eleventh bits from the memory chips 102, 106, 108, 110 (e.g., bit 10, bit 42, bit 58, bit 74). Row 324 illustrates the exclusive OR operation for bit 27 by performing the exclusive OR operation on the twelfth bits from the memory chips 102, 106, 108, 110 (e.g., bit 11, bit 43, bit 59, bit 75). Row 326 illustrates the exclusive OR operation for bit 28 by performing the exclusive OR operation on the thirteenth bits from the memory chips 102, 106, 108, 110 (e.g., bit 12, bit 44, bit 60, bit 76). Row 328 illustrates the exclusive OR operation for bit 29 by performing the exclusive OR operation on the fourteenth bits from the memory chips 102, 106, 108, 110 (e.g., bit 13, bit 45, bit 61, bit 77). Row 330 illustrates the exclusive OR operation for bit 30 by performing the exclusive OR operation on the fifteenth bits from the memory chips 102, 106, 108, 110 (e.g., bit 14, bit 46, bit 62, bit 78). Row 332 illustrates the exclusive OR operation for bit 31 by performing the exclusive OR operation on the sixteenth bits from the memory chips 102, 106, 108, 110 (e.g., bit 15, bit 47, bit 63, bit 79).

As such, sixteen bits are generated (e.g., bits 16-31) for the recovered data 32 for the memory chip 104. The parity logic 28 determines to add a "0" or a "1" to the recovered data 32 to result in an even parity (e.g., an even number of inputs are true) based on the exclusive OR operation performed for each of the bits.

Referring to FIG. 1, the memory controller 112 allows the corrupted data to be rebuilt from losing one memory chip of data through a UE 20 or from losing the data 10 if the memory chip is non-functional. As such, instead of receiving an error notification 18 that a UE 20 occurred, the memory controller 112 provides a way to correct the UE 20 by rebuilding the corrupted data. Thus, the host server system receives the recovered data 32 instead of a UE 20, resulting in the memory controller 112 reducing the UE rates at the server system.

If more than one memory chip had the UE 20 (e.g., two or more memory chips indicated that a UE 20 occurred), the memory controller 112 may be unable to rebuild the corrupted data and may generate a UE 20 for the data 10 to provide an alert that the data 10 is corrupted.

The memory controller 112 may also determine if a SDC 22 occurred in the data 10. The memory controller 112 may not receive any indication that an error occurred in the data 10 from the memory chips 102, 104, 106, 108, 110. However, the memory controller 112 may use the parity logic 28 to verify that an undetected SDC 22 did not occur in the data 10.

The memory controller 112 may use the parity logic 28 to perform a parity check on the data 10 to verify that an exclusive OR operation on the data 10 received in response to the read request 26 matches the parity bits 12 received. For example, the XOR gates 30 may perform an exclusive OR operation on the sixteen bits of the data 10 for each memory chip in the subset of memory chips 14 (e.g., 102, 104, 106, 108) and compare the output of the exclusive OR operation to the corresponding parity bit 12 received from the memory chip 110. If the comparison of the output of the exclusive OR operation matches the parity bits 12, the memory controller 112 reports no error on the data 10 and the server system may use the data 10.

If the comparison of the output of the exclusive OR operation does not match the parity bits 12 for one of the memory chips in the subset of the memory chips 14, the memory controller 112 may identify a SDC 22 (an undetected error) occurred in the data 10 and may generate a UE 20 indicating that the data 10 is corrupted. As such, the memory controller 112 may reduce the SDC 22 rates in the server system by identifying the SDCs 22 and generating UEs 20 instead.

If multiple SDCs 22 occurred (e.g., in more than one chip), the error may be identified by the comparison of the output of the XOR operation not matching the parity bit 12 and may generate the UE 20. In addition, multiple SDCs 22 occurred, the memory controller 112 may or may not be able to identify the SDC 22 and the SDC 22 may remain undetected in some cases.

As such, the memory controller 112 may be used to improve the number of UEs 20 by reducing the number of UEs 20 by recovering or rebuilding the corrupted data. The memory controller 1112 may also improve the SDCs 22 rates and by identifying the SDCs 22 and generating UEs 20 instead.

Figure 4:
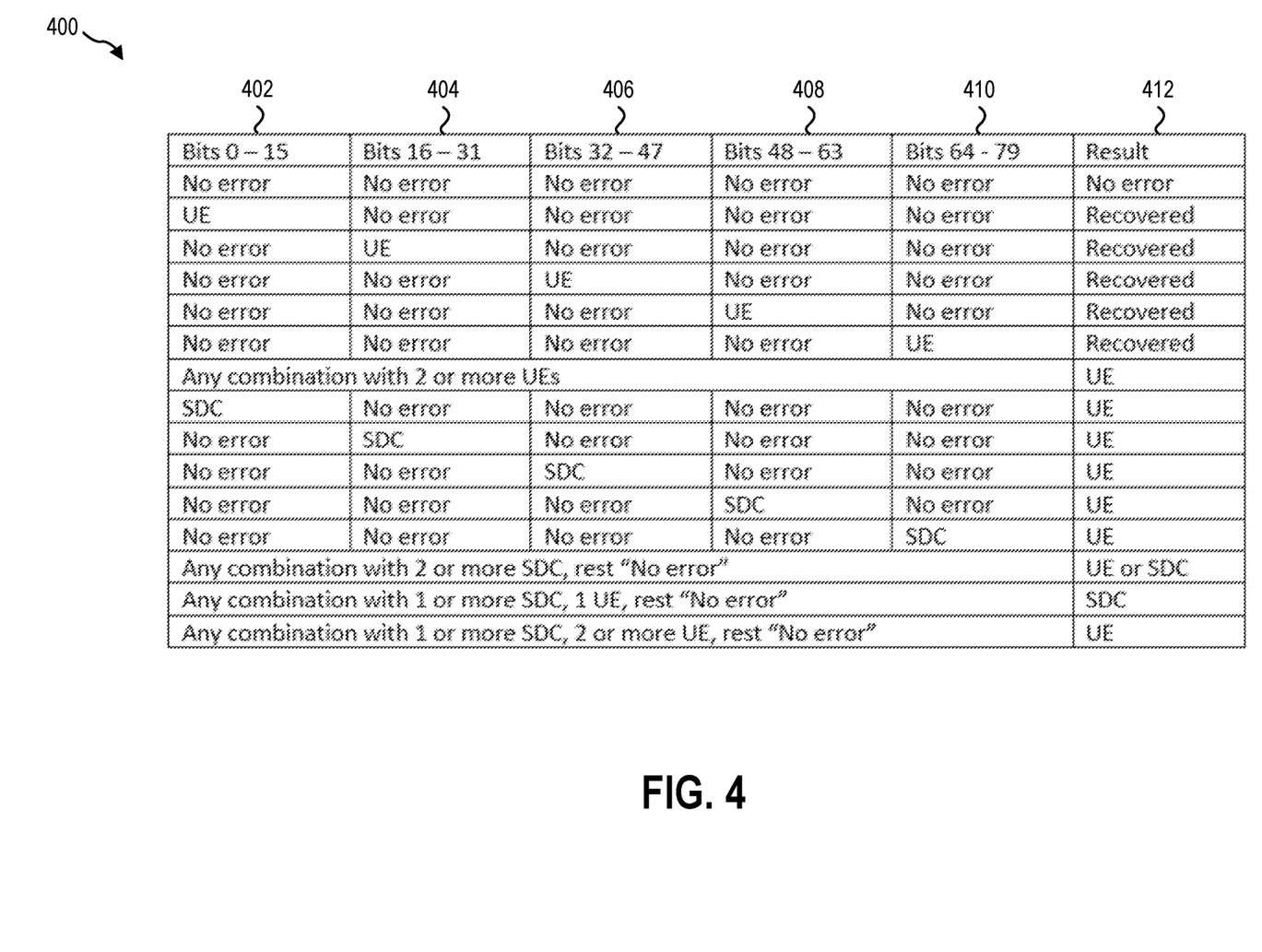
FIG. 4 illustrates an example table illustrating results for different uncorrectable errors (UEs) and silent data corruptions (SDCs) in accordance with implementations of the present disclosure.

Referring now to FIG. 4, illustrated is an example table 400 with different error notifications 18 (FIG. 1) received at the memory controller 112 (FIG. 1) from the different memory chips 102, 104, 106, 108, 110 (FIG. 1) in the memory bank 100 (FIG. 1) and/or any undetected errors, such as SDCs 22 (FIG. 1), identified by the memory controller 112. The table 400 also illustrates different results and/or outcomes of the data 10 (FIG. 1) from the memory controller 112 in response to the error notifications 18 and/or detecting any SDCs 22.

For example, column 402 may indicate any error notifications 18 received at the memory controller 112 from the memory chip 102 with any UEs 20 identified by the memory chip 102 for bits 0 through 15 of the data 10. In addition, column 402 may indicate whether any SDCs 22 for bits 0 through 15 of the data 10 took place.

Column 404 may indicate any error notifications 18 received at the memory controller 112 from the memory chip 104 with any UEs 20 identified by the memory chip 104 for bits 16 through 31 of the data 10. In addition, column 404 may indicate whether any SDCs 22 for bits 16 through 31 of the data 10 took place.

Column 406 may indicate any error notifications 18 received at the memory controller 112 from the memory chip 106 with any UEs 20 identified by the memory chip 106 for bits 32 through 47 of the data 10. In addition, column 406 may indicate whether any SDCs 22 for bits 32 through 47 of the data 10 took place.

Column 408 may indicate any error notifications 18 received at the memory controller 112 from the memory chip 108 with any UEs 20 identified by the memory chip 108 for bits 48 through 63 of the data 10. In addition, column 408 may indicate whether any SDCs 22 for bits 48 through 63 of the data 10 took place.

Column 410 may indicate any error notifications 18 received at the memory controller 112 from the memory chip 110 with any UEs 20 identified by the memory chip 110 for bits 64 through 79 of the parity bits 12. In addition, column 410 may indicate whether any SDCs 22 for bits 64 through 79 of the parity bits 12 took place.

Column 412 may indicate different results and/or outcomes of the data 10 from the memory controller 112 based on the error notifications 18 and/or the occurrence of any SDCs 22. The rows of the table 400 illustrate different error notifications 18 that may be received from the different memory chips 102, 104, 106, 108 and the corresponding results.

For example, if no error notifications 18 are received from the memory chips 102, 104, 106, 108, 110 and the memory controller 112 is unable to detect any SDCs 22, the result outputted for the data 10 from the memory controller 112 is no error, and thus, the data 10 may be used by, for example, a server system or data center. This may happen when two or more memory chips suffer SDC, and corrupted data bits perfectly cancel each other out in the parity calculation.

Another example may include if the error notifications 18 indicate a single UE 20 in any one of the memory chips 102, 104, 106, 108, 110, the memory controller 112 may generate the recovered data 32, as discussed above, and the result and/or outcome of the data 10 output from the memory controller 112 is the recovered data 32 and the recovered data 32 may be used by, for example, the server system or data center.

Another example may include if the error notifications 18 indicate multiple UEs 20 (e.g., two or more UEs 20) from any combination of the memory chips 102, 104, 106, 108, 110, the memory controller 112 may be unable to generate the recovered data 32 and the result and/or outcome of the data 10 from the memory controller 112 is an output indicating that a UE 20 occurred in the data 10. As such, the server system or data center may be notified that the data 10 or a portion thereof is corrupted to prevent usage of the data 10.

Another example may include if the memory controller 112 does not receive any error notifications 18 from any of the memory chips 102, 104, 106, 108, 110 but a single SDC 22 from one of the memory chips 102, 104, 106, 108, 110 has taken place, the result and/or outcome for the data 10 from the memory controller 112 may change from a SDC 22 to an output indicating that a UE 20 occurred in the data 10. As such, instead of a server system or data center, for example, using corrupted data unknowingly, the server system or data center may be notified that the data or a portion thereof is corrupted to prevent usage of the data 10.

Another example may include if the memory controller 112 does not receive any error notifications 18 from any of the memory chips 102, 104, 106, 108, 110 but multiple SDCs 22 (e.g., two or more SDCs 22) from any combination of the memory chips 102, 104, 106, 108, 110 have taken place, the result and/or outcome for the data 10 from the memory controller 112 may change from a SDC 22 to an output indicating that a UE 20 occurred in the data 10. In addition, the memory controller 112 may be unable to detect the multiple SDCs 22 and the result and/or outcome for the data 10 may remain a SDC 22 (e.g., the server system or data center may use corrupted data unknowingly).

Another example may include if the memory controller 112 receives an error notification 18 from any of the memory chips 102, 104, 106, 108, 110 indicating a UE 20 and one or more SDCs 22 occurred on one or more of the memory chips 102, 104, 106, 108, 110, the memory controller 112 may be unable to detect the SDCs 22 that occurred and the result and/or outcome of the data 10 may remain a SDC 22 (e.g., the server system or data center may use corrupted data unknowingly).

Another example may include if the memory controller 112 receives multiple error notifications 18 (e.g., two or more error notifications 18) from any of the memory chips 102, 104, 106, 108, 110 indicating multiple UEs 20 and the memory controller 112 detected one or more SDCs 22 that occurred on one or more of the memory chips 102, 104, 106, 108, 110, the result and/or outcome for the data 10 from the memory controller 112 may change from a SDC 22 to an output indicating that a UE 20 occurred in the data 10. The memory controller 112 may be able to do so because multiple UEs result in a UE 20 and no attempt to correct the data may be made. As such, instead of a server system or data center, for example, using corrupted data unknowingly, the server system or data center may be notified that the data or a portion thereof is corrupted to prevent usage of the data 10.

As such, the memory controller 112 may improve the UE 20 and the SDC 22 rates for the memory chips 102, 104, 106, 108, 110 by reducing the number of UEs 20 by generating the recovered data 32 and by reducing the number of SDCs 22 by generating UEs 20 instead. Thus, the memory controller 112 may improve error correction for the memory chips 102, 104, 106, 108, 110.

Figure 5:
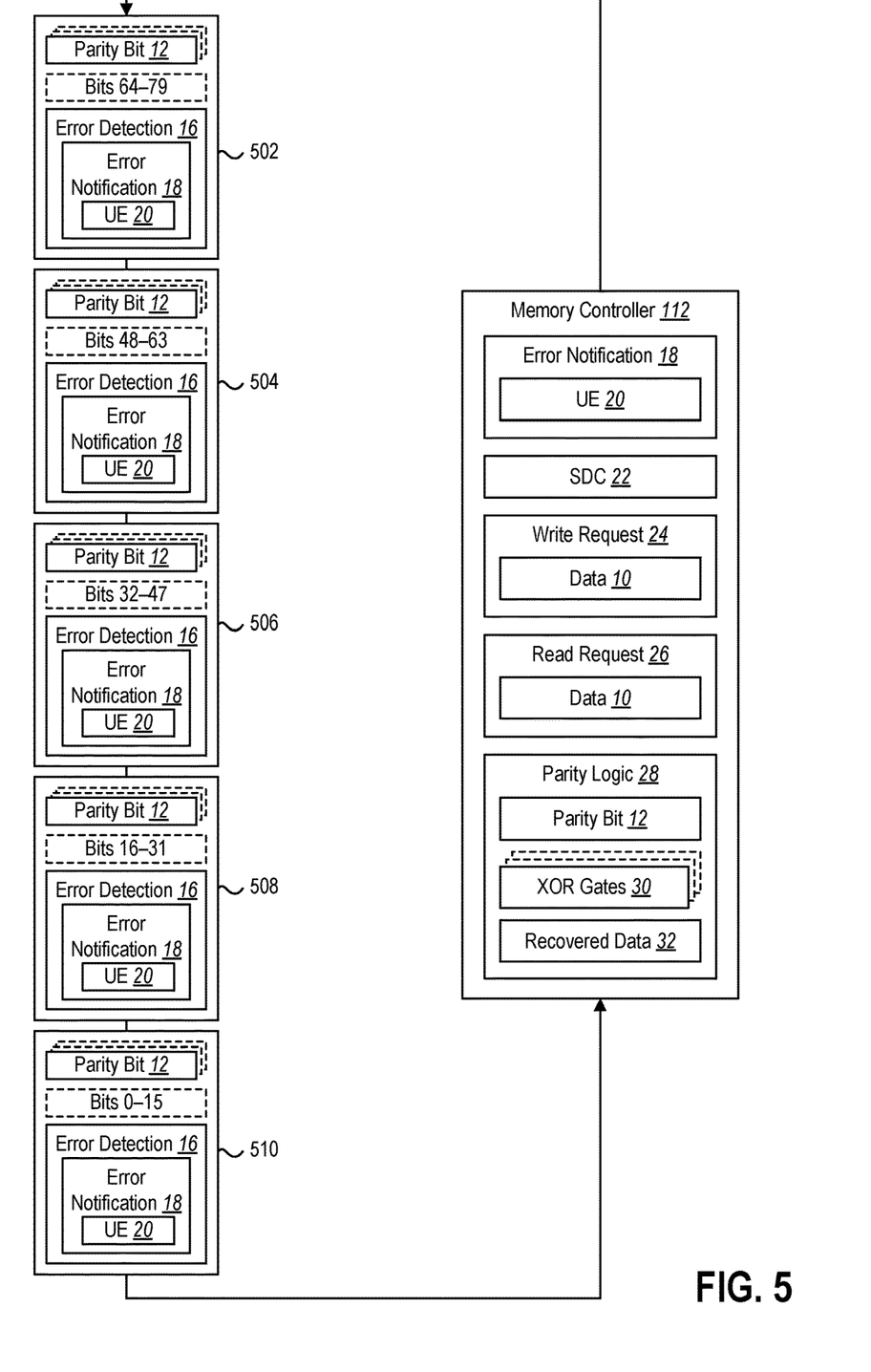
FIG. 5 illustrates an example memory bank with vertical memory chips with built in error detection for use with error correction in accordance with implementations of the present disclosure.

Referring now to FIG. 5, illustrated is a memory bank 500 with a plurality of memory chips 502, 504, 506, 508, 510 with built in error detection 16 for use with error correction. While five memory chips 502, 504, 506, 508, 510 are illustrated, any number of memory chips may be used in the memory bank 500. In an implementation, the memory chips 502, 504, 506, 508, 510 are DRAM memory chips. In this example, memory chips 502, 504, 506, 508, 510 may share a single data bus, thus requiring that only one chip can be read or written at a time.

A subset of memory chips 14 (e.g., 504, 506, 508, 510) may be used to store the data 10. One additional memory chip 502 (e.g., n+1) is used for the parity bits 12. As such, the memory bank 500 may include five memory chips (e.g., 502, 504, 506, 508, 510) with a width of sixteen bits, with four memory chips in the subset of memory chips 14 (e.g., 504, 506, 508, 510) used for data 10 storage and one redundant memory chip (e.g., 502) for storing the parity bits 12.

The plurality of memory chips 502, 504, 506, 508, 510 may be arranged in a vertical orientation and may share the same data bus in communication with the memory controller 112. For a given access, only one memory chip is active, and the active memory chip provides and/or stores all the data for the one access. For example, a unit of access is a cacheline and the entire cacheline comes from the one active memory chip. The parity bits operates on multiple cachelines. As such, only sixteen bits of data 10 and/or the parity bits 12 may be available at one time from the different memory chips 502, 504, 506, 508, 510 for use by the memory controller 112 for a write request 24 of the data 10 and/or the read request 26 for the data 10. Reading and/or writing the data 10 may be more time consuming because only one memory chip is read from and/or written to at a time by the memory controller 112.

Before commencing normal operation, the memory controller 112 may initially zero out all the memory chips 502, 504, 506, 508, 510 in the memory bank 500 by writing "0s" in all the memory chips 502, 504, 506, 508, 510. Subsequently, for a write request 24, the memory controller 112 may write to one memory chip in the subset of the memory chips (e.g., 504, 506, 508, 510) for a given write request and may use the XOR gates 30 of the parity logic 28 to generate the parity bit 12 for the corresponding memory chip by first reading existing parity stored in that memory chip. The new parity to be written is generated as XOR operation of the new data and the existing parity. The memory controller 112 may update the parity bit 12 for the memory chip that the write is occurring for without updating the parity bits 12 for the remaining memory chips.

For a read request 26, the memory controller 112 may first read the data 10 from a selected memory chip (e.g., bits 48 through 63 from the memory chip 504) in the subset of the memory chips 14 (e.g., 504, 506, 508, 510). If there is no UE 20 reported by the selected memory chip, the read request may be completed. If an SDC had occurred, the memory controller 112 would not have any way to detect it in this case.

If a UE was reported or if memory controller 112 wishes to check for SDC, the memory controller 112 may read data from the remaining memory chips out of 502, 504, 506, 508 and 510 and use the XOR gates 30 to perform an XOR function of the data 10 (e.g., bits 48 through 63) and the corresponding parity bits 12 for each memory chip as the read is occurring. As such, the memory controller 112 may rebuild the data 10 to generate the recovered data 32 if the memory controller 112 received an error notification 18 with a UE 20 from any one of the memory chips 502, 504, 506, 508, 510.

If the memory controller 112 did not receive any error notifications 18 from any of the memory chips 502, 504, 506, 508, 510, the memory controller 112 may decide whether to perform a check verifying whether any SDCs 22 occurred in the data 10. The memory controller 112 may utilized the data read from each memory chip 502, 504, 506, 508 and perform an XOR operation for each memory chip individually and compare the output of the XOR operation with the parity bits 12 to determine if any SDCs 22 occurred in the data 10.

However, the performance delay of reading each memory chip 502, 504, 506, 508, 510 one at a time and performing a verification with the parity bits 12 one at a time to detect if any SDCs 22 occurred, may prevent the memory controller 112 from performing the SDC 22 verifications. As such, the memory controller 112 may decide whether to perform the SDC verification.

Memory bank 500 may be used to reduce the UE 20 error rate by generating the recovered data 32 for the error notifications 18 reporting the UEs 20. In addition, the memory bank 500 may be used to reduce the SDCs 22 rates based on decisions by the memory controller 112 whether to perform the SDC 22 detections.

Figure 6:
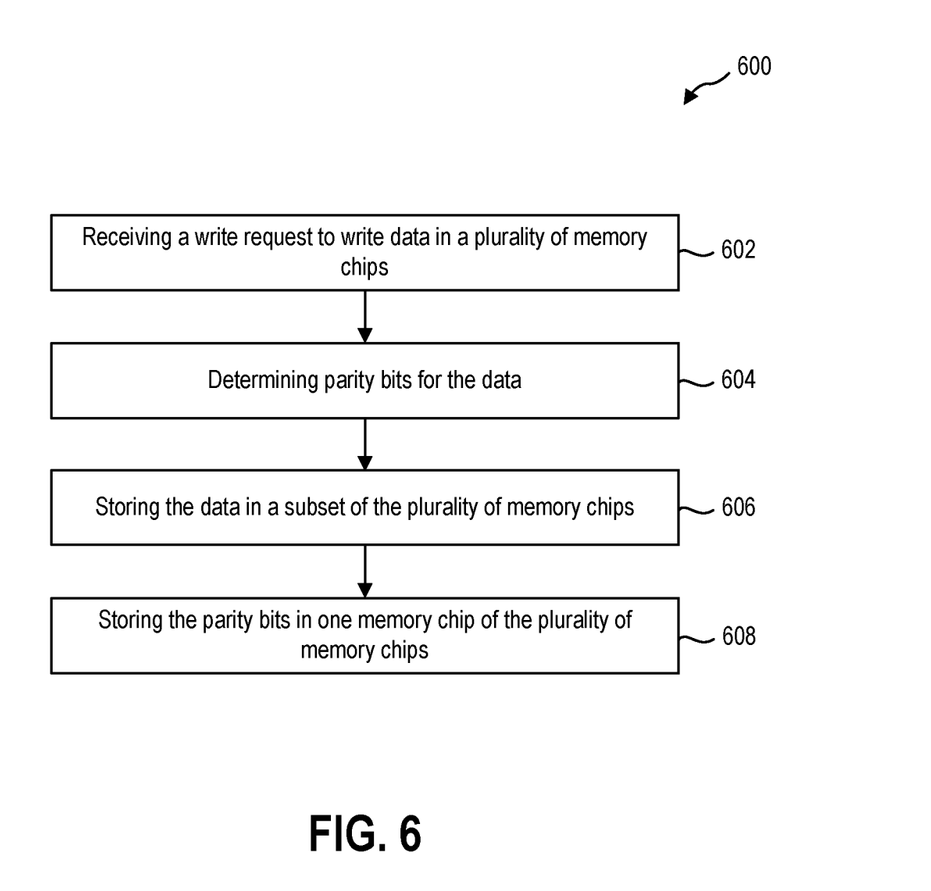
FIG. 6 illustrates an example method for writing data and parity bits in accordance with implementations of the present disclosure.

Referring now to FIG. 6, illustrated is an example method 600 for writing data 10 (FIG. 1) and parity bits 12 (FIG. 1) in a memory bank 100 (FIG. 1). The actions of method 600 may be performed by the memory controller 112 (FIG. 1). The actions of method 600 may be discussed below with reference to the architectures of FIG. 1.

At 602, method 600 may include receiving a write request to write data in a plurality of memory chips. The memory bank 100 may include a plurality of memory chips (e.g., 102, 104, 106, 108, 110) up to n (where n is a positive integer). The memory chips (e.g., 102, 104, 106, 108, 110) may be any memory chip that includes error detection 16 that may detect when an error occurs in the data 10. In an implementation, the memory chips (e.g., 102, 104, 106, 108, 110) may be DRAM memory chips. For example, the memory controller 112 may receive a write request 24 to write data 10 to the plurality of memory chips in the memory bank 100. The memory chips (e.g., 102, 104, 106, 108, 110) may be arranged in a horizontal orientation and may operate in parallel. As such, all bits of the data 10 may be available at one time for use by the memory controller 112 for the write request 24 of the data 10.

At 604, method 600 may include determining parity bits for the data. The memory controller 112 may take the bits of the data and may perform an exclusive OR operation to generate the parity bits 12. For example, if the memory chips (e.g., 102, 104, 108, 110) are sixteen bits wide and the data path is sixty four bits, the memory controller 112 may take the sixteen bits for each memory chip in the subset of memory chips 14 (e.g., 102, 104, 106, 108) and perform an exclusive OR operation and save the output as the parity bits 12 in the memory chip 110.

In an implementation, the memory controller 112 may include a parity logic 28 that includes a plurality of XOR gates 30 to perform the exclusive OR operation. The number of XOR gates 30 may equal the width of the memory chips. For example, if the width of the memory chips (e.g., 102, 108, 106, 108, 110) is sixteen bits and four memory chips (e.g., 102, 108, 106, 108) are used for storing the data 10, the parity logic 28 may include sixteen different four-input XOR gates 30, one for each bit. In addition, the XOR gates 30 may operate in parallel and perform the bitwise parity concurrently for each of the bits. As such, the parity logic 28 may perform the exclusive OR operations in parallel and generate the sixteen parity bits 12 at once. If an odd number of inputs are true in the exclusive OR operation (e.g., an odd number of bits have a "1"), the output is true, and the parity bit 12 is set as "1." If an even number of inputs are true in the exclusive OR operation (e.g., an even number of bits have a "1"), the output is false, and the parity bit 12 is set as "0."

At 606, method 600 may include storing the data in a subset of the plurality of memory chips. A subset of memory chips 14 (e.g., 102, 104, 106, 108) may be used to store the data 10. The subset of memory chips 14 may be one less than the total number of memory chips (e.g., n−1) in the memory bank 100. An additional memory chip (e.g., 110), different from the memory chips included in the subset of memory chips 14, may be used to store parity bits 12 for verifying the authenticity of the data 10 and correct any errors in the data 10 that may have occurred in the data 10. The number of memory chips included in the subset of memory chips 14 may be based on the channel width of the data. For example, if the channel width of the data is sixty four bits and the memory chips are sixteen bits wide, four memory chips are included in the subset of memory chips 14 and one additional memory chip is used for the parity bits 12. As such, the memory bank 100 may include five memory chips with a width of sixteen bits, with four memory chips in the subset of memory chips 14 (e.g., 102, 104, 106, 108) used for data 10 storage. The memory controller 112 may store the data 10 in the subset of memory chips 14 with the first sixteen bits of data (e.g., bits 0-15) in the memory chip 102, the second sixteen bits of data (e.g., bits 16-31) in the memory chip 104, the third sixteen bits of data (e.g., bits 32-47) in the memory chip 106, and the fourth sixteen bits of data (e.g., bits 48-63) in the memory chip 108.

At 608, method 600 may include storing the parity bits in one memory chip of the plurality of memory chips. The one memory chip may be different from the memory chips included in the subset of memory chips. The memory controller 112 may store the parity bits 12 (e.g., bits 64-79) in the memory chip 110. As such, the data 10 payload is in bits 0 through 63 and the ECC is in bits 64 through 79.

As such, method 600 may be used to determine a bitwise parity of the data stored in the subset of memory chips 14 and store the data and the parity bits 12 in the memory bank 100.

Figure 7:
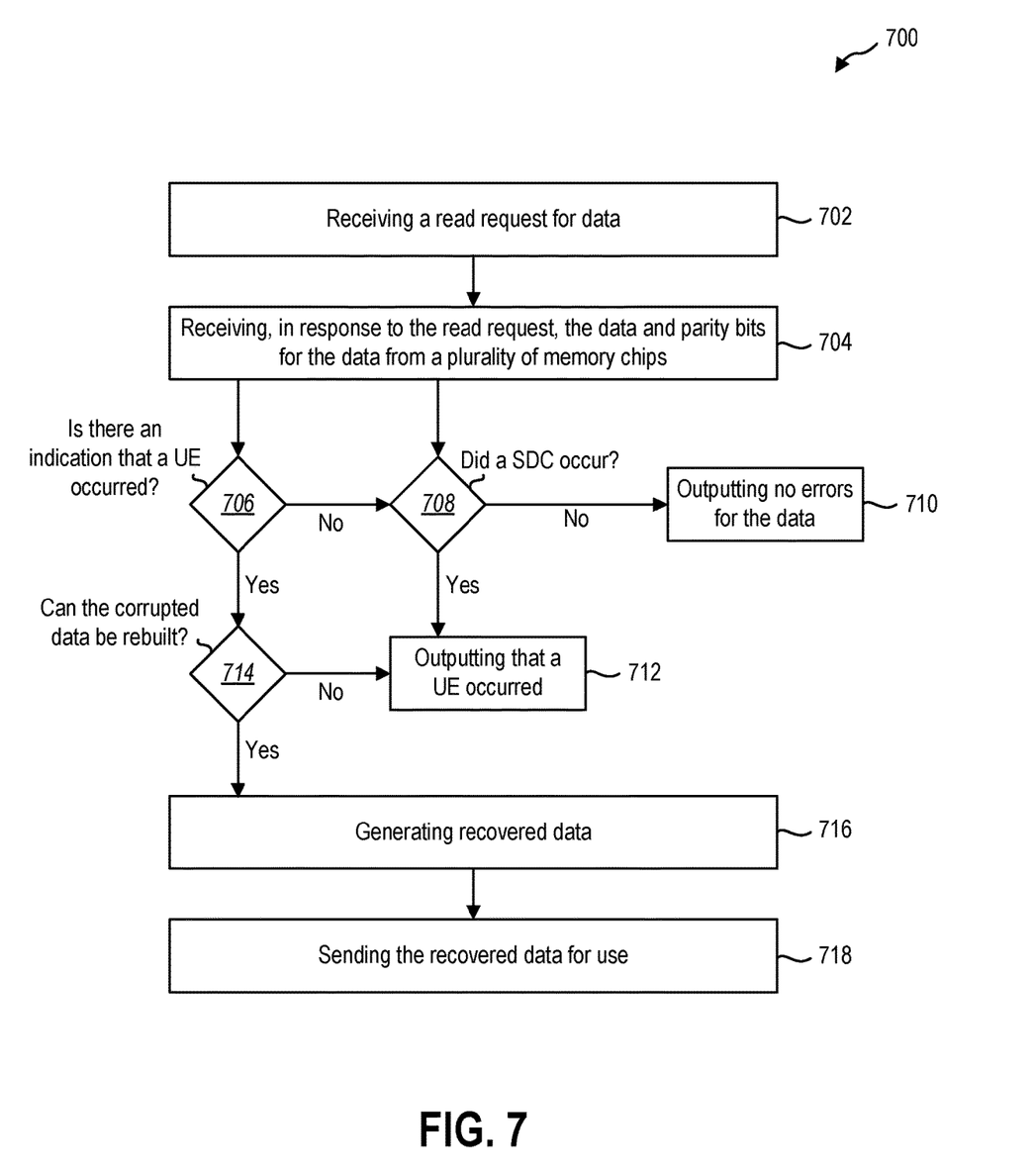
FIG. 7 illustrates an example method for reading data and recovering corrupted data in accordance with implementations of the present disclosure.

Referring now to FIG. 7, illustrated is an example method 700 for reading data 10 (FIG. 1) from memory bank 100 (FIG. 1) and recovering corrupted data. The actions of method 700 may be performed by the memory controller 112 (FIG. 1) and the actions of method 700 may be discussed below with reference to the architectures of FIG. 1.

At 702, method 700 may include receiving a read request for data. The memory controller 112 may receive a read request 26 for the data 10 stored in a subset of the memory chips 14 (e.g., 102, 104, 106, 108) of the memory bank 100. The memory controller 112 may perform a read operation on the plurality of memory chips (e.g., 102, 104, 106, 108, 110) for the data 10. The memory chips (e.g., 102, 104, 106, 108, 110) may be arranged in a horizontal orientation and may operate in parallel. As such, all bits of the data 10 may be available at one time for use by the memory controller 112 for the read request 26 of the data 10.

At 704, method 700 may include receiving, in response to the read request, the data and parity bits for the data from a plurality of memory chips. The memory controller 112 may receive the data 10 from the subset of memory chips 14 (e.g., 102, 104, 106, 108) and may receive the parity bits 12 from the memory chip 110 in response to the read request 26. For example, if the memory chips 102, 104, 108, 110 are sixteen bits wide and the data path is sixty four bits, the memory controller 112 may receive the first sixteen bits of data (e.g., bits 0-15) from the memory chip 102, the second sixteen bits of data (e.g., bits 16-31) from the memory chip 104, the third sixteen bits of data (e.g., bits 32-47) from the memory chip 106, and the fourth sixteen bits of data (e.g., bits 48-63) from the memory chip 108 and the parity bits 12 (e.g., bits 64-79) from the memory chip 110.

At 706, method 700 may include determining whether an error notification is received indicating that a UE occurred. The memory controller 112 may also receive an error notification 18 indicating that a UE 20 occurred in one or more memory chips of the plurality of memory chips (e.g., 102, 104, 106, 108, 110). The error notification 18 may indicate which memory chip(s) of the plurality of memory chips (e.g., 102, 104, 106, 108, 110) had the UE 20. By receiving the error notification 18, the memory controller 112 may be alerted that the data 10 or a portion thereof is corrupted and the memory controller 112 may prevent the usage of the corrupted data. If one memory chip had the UE 20, the memory controller 112 may use the parity logic 28 to recreate the corrupted data from the memory chip with the UE 20 using the parity bits 12 and generate recovered data 32.

At 708, method 700 may include determining whether a SDC occurred in response to determining that an error notification was not received. If the memory controller 112 did not receive any error notifications 18 from the plurality of memory chips (e.g., 102, 104, 106, 108, 110), the memory controller 112 may also determine if a SDC 22 occurred in the data 10. The memory controller 112 may not receive any indication that an error occurred in the data 10 from the memory chips 102, 104, 106, 108, 110. However, the memory controller 112 may use the parity logic 28 to verify that an undetected SDC 22 did not occur in the data 10.

The memory controller 112 may use the parity logic 28 to perform a parity check on the data 10 to verify that an exclusive OR operation on the data 10 received in response to the read request 26 matches the parity bits 12 received. For example, the XOR gates 30 may perform an exclusive OR operation on the sixteen bits of the data 10 for each memory chip in the subset of memory chips 14 (e.g., 102, 104, 106, 108) and may compare the output of the exclusive OR operation to the corresponding parity bit 12 received from the memory chip 110.

At 710, method 700 may include outputting no errors for the data in response to determining that a SDC did not occur in the data. If the comparison of the output of the exclusive OR operation matches the parity bits 12, the memory controller 112 reports no error on the data 10 and the server system may use the data 10.

At 712, method 700 may include outputting that a UE occurred in response to determining that a SDC occurred in the data. If the comparison of the output of the exclusive OR operation does not match the parity bits 12 for one of the memory chips in the subset of the memory chips 14, the memory controller 112 may identify a SDC 22 (an undetected error) occurred in the data 10 and may generate an output with a UE 20 indicating that the data 10 or a portion thereof is corrupted. As such, the memory controller 112 may reduce the SDC 22 rates in the server system by identifying the SDCs 22 and generating UEs 20 instead.

At 714, method 700 may include determining whether the corrupted data may be rebuilt. If one memory chip had the UE 20, the memory controller 112 may be able to recreate the corrupted data using the parity bits 12.

If the corrupted data may not be rebuilt, method 700 may return to 712, and output that a UE occurred. If more than one memory chip had the UE 20 (e.g., two or more memory chips indicated that a UE 20 occurred), the memory controller 112 may be unable to rebuild the corrupted data and may generate an output indicating a UE 20 for the data 10 to provide an alert that the data 10 is corrupted.

At 716, method 700 may include generating recovered data in response to determining that the corrupted data may be rebuilt. The memory controller 112 may use the parity logic 28 to recreate the corrupted data from the memory chip with the UE 20 using the parity bits 12 and generate recovered data 32.

In an implementation, the XOR gates 30 of the parity logic 28 may perform an exclusive OR operation to rebuild the corrupted data using the parity bits 12. As such, the same XOR gates 30 that generated the parity bits 12 may regenerate the bits for the corrupted data to rebuild the bits and generate the recovered data 32. The XOR gates 30 may use the data 10 from the remaining memory chips to recreate the corrupted data for the identified memory chip with the UE 20 and generate the recovered data 32 for the identified memory chip with the UE 20. The parity logic 28 determines to add a "0" or a "1" to the recovered data 32 to result in an even parity (e.g., an even number of inputs are true) based on the exclusive OR operation performed for each of the bits by the XOR gates 30.

In addition, the XOR gates 30 may also rebuild data from a non-functional memory chip (e.g., a single device data correction (SDDC)), even if a UE 20 is not received. The XOR gates 30 may operate in parallel and may perform an exclusive OR operation using the bits from the remaining memory chips and the parity bits 12 to recreate the corrupted data.

At 718, method 700 may include sending the recovered data for use. The memory controller 112 may send the recovered data 32 to a host system for use, such as, but not limited to, a host server system. As such, instead of receiving an error notification 18 that a UE 20 occurred, the memory controller 112 provides a way to correct the UE 20 by rebuilding the corrupted data. Thus, the host server system receives the recovered data 32 for use instead of a UE 20, resulting in the memory controller 112 reducing the UE rates at the server system.

At such, method 700 may be used to reduce the UE and SDC rates in the memory bank 100.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. In some contexts, the term memory can include either volatile or non-volatile memory. Memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system, comprising:
   a plurality of memory chips with built in error detection, wherein a subset of the memory chips stores data and one memory chip different from the subset of the memory chips stores parity bits; and
   a memory controller in communication with the plurality of memory chips, wherein the memory controller is operable to:
      receive a write request for the data;
      determine the parity bits by performing an exclusive OR operation on each bit of the data and storing the parity bits in the one memory chip;
      store the data in the subset of the memory chips based on a bit-width for each memory chip;
      receive a read request of the data;
      receive, in response to the read request, the data from the subset of the memory chips, the parity bits from the one memory chip, and an indication that no errors occurred when reading the data from the subset of the memory chips; and
      verify whether a silent data corruption occurred in the data in any of the plurality of memory chips.

2. The system of claim 1, wherein the memory controller is further operable to:
   receive a read request for the data; and
   receive, in response to the read request, the data from the subset of the memory chips, the parity bits from the one memory chip, and an indication from any of the built in error detection of the plurality of memory chips whether an uncorrectable error (UE) occurred in the data.

3. The system of claim 2, wherein the memory controller is further operable to:
   identify a memory chip that sent the indication that the UE occurred; and
   generate recovered data for the memory chip by rebuilding corrupted data for the memory chip using the parity bits.

4. The system of claim 3, wherein the memory controller is further operable to generate the recovered data by:
   performing an exclusive OR operation with the parity bits and the data from the plurality of memory chips that did not send the indication;
   determining, based on the exclusive OR operation, whether to add a one or a zero for a bit of the recovered data for the memory chip to result in an even parity.

5. The system of claim 2, wherein the memory controller is further operable to:
   identify a plurality of memory chips that sent the indication that the UE occurred; and
   output a result that the UE occurred indicating that the data is corrupted.

6. The system of claim 1, wherein the memory controller is further operable to verify whether the silent data corruption occurred by:
   performing an exclusive OR operation of the data from the subset of the memory chips;
   comparing an output of the exclusive OR operation with the parity bits; and
   sending a result that an uncorrectable error (UE) occurred indicating that the data is corrupted based on a match not occurring between the output of the exclusive OR operation and the parity bits.

7. The system of claim 6, wherein the memory controller is further operable to:
   send a result indicating that no errors occurred in the data based on a match occurring between the output of the exclusive OR operation and the parity bits.

8. The system of claim 1, wherein the plurality of memory chips are arranged in a horizontal orientation and operate in parallel.

9. The system of claim 1, wherein the memory controller includes a parity logic with a plurality of exclusive OR logic gates operating in parallel that determine the parity bits for the data.

10. The system of claim 9, wherein a number of the plurality of exclusive OR logic gates is equal to the number of the bit-width for each memory chip of the plurality of memory chips.

11. The system of claim 1, wherein a number of memory chips in the plurality of memory chips is based on a channel width for a data payload and the bit-width for each memory chip of the plurality of memory chips.

12. The system of claim 11, wherein the number of memory chips is five, the channel width is sixty four bits and the width for bits of each memory chip is sixteen bits.

13. A system, comprising:
   a plurality of memory chips with built in error detection arranged in a vertical orientation sharing a single data bus, wherein a subset of the memory chips stores data and a memory chip different from the subset of the memory chips stores parity bits; and
   a memory controller in communication with the plurality of memory chips, wherein the memory controller is operable to:
      receive a write request for the data, wherein the memory controller writes to one memory chip of the subset of the memory chips for the write request;

determine the parity bits for the data by reading existing parity bits stored in the one memory chip and performing an exclusive OR operation on the data and the existing parity bits; and update the existing parity bits for the one memory chip of the subset of the memory chips based on the exclusive OR operation of the data and the existing parity bits without updating parity bits of the remaining memory chips of the subset of the memory chips.

14. The system of claim 13, wherein the memory controller is further operable to:

receive a read request for the data for a selected memory chip of the subset of the memory chips;

perform a read operation, in response to the read request, for the selected memory chip; and determine whether an uncorrectable error (UE) occurred when reading the data from the selected memory chip.

15. The system of claim 14, wherein the memory controller is further operable to:

read the data from the remaining memory chips in the subset of the memory chips and the parity bits in the memory chip in response an indication that the UE occurred; and generate recovered data for the selected memory chip by rebuilding corrupted data for the selected memory chip by performing an exclusive OR operation with the parity bits and the data from the remaining memory chips and determining, based on the exclusive OR operation, whether to add a one or a zero for a bit of the recovered data for the memory chip to result in an even parity.

16. The system of claim 14, wherein the memory controller is further operable to complete the read request in response to determining that the UE did not occur.

17. The system of claim 14, wherein the memory controller is further operable to:

determine whether to verify if a silent data corruption occurred in the data in any of the plurality of memory chips in response to determining that the UE did not occur.

18. The system of claim 17, wherein the memory controller is further operable to verify if the silent data corruption occurred in the data based on the determination by:

reading the data from the remaining memory chips in the subset of the memory chips and the parity bits in the memory chip in response an indication that the UE occurred;

performing an exclusive OR operation of the data from the subset of the memory and the parity bits;

comparing an output of the exclusive OR operation with the parity bits; and sending a result that an uncorrectable error (UE) occurred indicating that the data is corrupted based on a match not occurring between the output of the exclusive OR operation and the parity bits.

19. A method, comprising:

receiving a read request for data, wherein a subset of a plurality of memory chips with built in error detection stores the data;

receiving the data from the subset of the memory chips;

receiving parity bits, wherein one memory chip in the plurality of memory chips, different from the subset of the memory chips, stores the parity bits; and verifying whether a silent data corruption occurred in the data in any of the plurality of memory chips in response to an indication that no errors occurred when reading the data from the subset of the memory chips.

* * * * *